United States Patent [19]

Tabacchi

[11] Patent Number: 5,043,698
[45] Date of Patent: Aug. 27, 1991

[54] AUTOMATIC DEVICE FOR SENSING SUDDEN DECELERATION, APPLICABLE TO MOTOR VEHICLES

[76] Inventor: Giuseppe Tabacchi, Via Boldrini, 12, 40121 Bologna, Italy

[21] Appl. No.: 238,354

[22] Filed: Aug. 30, 1988

[30] Foreign Application Priority Data

Sep. 23, 1987 [IT] Italy ................... 3618 A/87

[51] Int. Cl.⁵ ................................ B60Q 1/50
[52] U.S. Cl. .................... 340/467; 340/463; 307/10.8
[58] Field of Search .......... 340/463, 464, 466, 467, 340/441; 307/10.8

[56] References Cited

U.S. PATENT DOCUMENTS

| | | | |
|---|---|---|---|
| 3,634,792 | 1/1972 | Blomenkamp et al. | 340/467 |
| 3,794,971 | 2/1974 | Hida et al. | 340/441 X |
| 4,097,842 | 6/1978 | Zalar et al. | 340/467 |
| 4,320,384 | 3/1982 | Carlson | 340/467 |

FOREIGN PATENT DOCUMENTS

| | | |
|---|---|---|
| 2251917 | 10/1972 | Fed. Rep. of Germany . |
| 3313678 | 10/1984 | Fed. Rep. of Germany . |
| 2199592 | 9/1972 | France . |
| 2225007 | 10/1974 | France . |
| 57-03966 | 12/1982 | Japan . |
| 7203701 | 3/1972 | Netherlands . |
| 1386600 | 11/1971 | United Kingdom . |
| 2065347 | 6/1981 | United Kingdom . |
| 2175462 | 4/1986 | United Kingdom . |

OTHER PUBLICATIONS

Elector Publication, vol. 2, No. 9, Sep. 1976.

Primary Examiner—Edward L. Coles, Sr.
Assistant Examiner—Jeffery A. Hofsass
Attorney, Agent, or Firm—Dvorak and Traub

[57] ABSTRACT

The device is capable of providing an automatic and timely indication of any sudden deceleration in the vehicle to which it is fitted, for the benefit of drivers following behind. A signal proportional to road speed is suitably generated and relayed to a discriminator capable of distinguishing between acceleration and deceleration and, on sensing sudden deceleration, of switching on the stop lights by way of an independent circuit installed in parallel with the stop light circuit of the vehicle.

13 Claims, 1 Drawing Sheet

AUTOMATIC DEVICE FOR SENSING SUDDEN DECELERATION, APPLICABLE TO MOTOR VEHICLES

BACKGROUND OF THE INVENTION

The invention relates to an automatic device for application to motor vehicles, which is designed to detect and indicate any sudden deceleration of the vehicle to which it is fitted.

Currently, the driver of a motor vehicle utilizes stop lights in order to give evidence of having applied the brakes, and to indicate having finally brought the vehicle to a standstill. Upon depressing the brake pedal, the stop lamps light up when the pedal itself engages a spring-loaded switch that completes the electrical stop light circuit. In other situations, such as a reduction in road speed, application of the hand brake, changing down from high to lower gear ratios, encountering a sudden change in gradient, momentary pauses, or stalling of the engine while on the move, no visual evidence of deceleration is provided by the stop lights. Any one of these contingencies can arise in traffic, potentialy when vehicles are moving at considerable speed. Under these circumstances, drivers have no immediate warning of what is happening ahead. It often occurs that a driver will run into the back of the vehicle in front, through lack of sufficient braking distance, causing a pile-up.

In freeway driving, where speeds are higher, the situations mentioned produce a great many accidents. The situation is worsened if traffic is running in snow and ice, since application of the brakes or rapid movement down through the gears will tend to lock the wheels, causing the vehicle to skid and veer out of control.

Other factors aggravate the situation, for example, fog, in disposition of the driver during an accident (shock, fainting), and failure of the indication system, whether mechanical, hydraulic or electrical, etc.

The problem in question has existed for some time, and efforts have been made by those skilled in the art to solve it using electromechanical devices to exploit physical principles, but without any particular success.

Certain devices, for example, are operated by a mechanical pendulum, or centrifugal weights. These, however, are naturally influenced by pitching and rolling of the vehicle when in transit, by heavy articles carried in the trunk, stresses attributable to bumps in the road, vibration, and gradients.

Such is the case with devices disclosed in two patents, Great Britain 20 653 447A and U.S. Pat. No. 4,320,384, which feature the use of a mechanical pendulum in conjunction with a photocell, and German 3 313 678A1, which discloses a pendulum operating in parallel with the stop light switch.

In the particular instance of devices that use centrifugal weights, U.S. Pat. No. 3,794,971 discloses means for sensing the speed of a vehicle which is triggered by the field emitted from permanent magnets associated directly with a device designed to produce movement that is proportional to the speed of the vehicle. More exactly, the device features a combination of electrical and mechanical expedients, such that the speed of the vehicle registers by way of a cable (e.g., the speedometer drive cable) which rotates a spindle carrying two centrifugal weights. These weights impart a force to a sleeve and a lever which is proportional to the speed of the vehicle. The movement of magnets, rigidly attached to the lever, creates a variable magnetic field that excites induction transducers connected electrically to the indication medium.

Other devices are applied to parts of the engine such as the throttle flap of the carburetor, as in French 2 225 007. Others utilize a signal taken off the primary winding of the ignition coil and are triggered by a drop in speed, as in U.S. Pat. No. 4,097,842.

There are also devices, such as that disclosed in French 2 199 592, which make use of electronic devices to indicate deceleration of the vehicle. The French Patent in question comprises unspecified means which are capable of generating signals proportional to the vehicle speed, and relaying them to comparators. The comparators process the signals and compare them with a given reference. The drawings accompanying the French specification show general or block diagrams of the device only, without giving details of the single elements, so that the choice of the electric and electronic components making up each block remains undetermined.

Accordingly, the object of the invention is to overcome the drawbacks mentioned above, and in particular, to ensure that the stop lights of the vehicle indicate deceleration in real time, or before the moment when the pedal-operated stop light switch is actuated by applying the brakes.

The stated object is realized with an automatic device according to the invention, which operates independently of and in parallel with the standard stop light circuit of the vehicle, and is capable of completing a circuit in real time, thereby making traffic conditions safer.

Moreover, the device is not influenced either by pitching and rolling of the vehicle when in movement (ascent, descent, heavy loading), or by the bumpiness of the ride.

SUMMARY OF THE INVENTION

The device comprises electromechanical means, connected directly to the vehicle's own speed measuring instruments (for example, the speedometer), which are capable of generating electrical signals and relaying them to converter means consisting of a transformer. The transformer is capable of stepping up and supplying a voltage in proportion to the input signal received. The transformer output signal is fed into two electrical circuits wired in parallel, each including a rectifier diode in series with a respective resistive/capacitive circuit. The ratings of the two capacitors are dissimilar, such that the rate of discharge from each one is different.

During sudden deceleration of the vehicle, these two circuits will supply two signals of different strength to discriminator means, such that dissimilar potential differences are created at the inputs of the discriminator means. The device thus establishes the plus or minus value and the extent of any variation in road speed, and will proceed to trigger operation of the stop lights accordingly.

It is known that the time lapse which passes before a motor vehicle is braked, given the response of the average driver, is approximately 1 second (clearly discernable in literature from countries worldwide). In this interval of time, a vehicle travelling at 70 mph will have covered some 35 yards before the pedal is depressed and visual evidence of braking is produced.

With an automatic device as disclosed, the sudden deceleration of a motor vehicle is indicated before the brake pedal is depressed, anticipating normal switching of the stop lights via the pedal by approximately 3/5 of one second. Thus, in the case in point, the moment the driver's foot is lifted off the accelerator pedal, the occupant of the vehicle behind will be warned visually of the situation 20 yards before the brakes are applied, and, therefore, can take appropriate action 20 yards earlier. To see a brake light appear on the vehicle ahead 20 yards earlier than normal offers a great advantage to any driver, since additional time is allowed in which to control his/her own vehicle and avoid a crash.

Clearly, the higher the speed, the greater will be the corresponding margin of advance warning.

A further feature of the device according to the invention is its economy, obtained by virtue of the fact that it consists of and utilizes conventional components in conjunction with the standard speed measuring instruments of a vehicle, and produces an indication via the stop lights already fitted to the vehicle.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
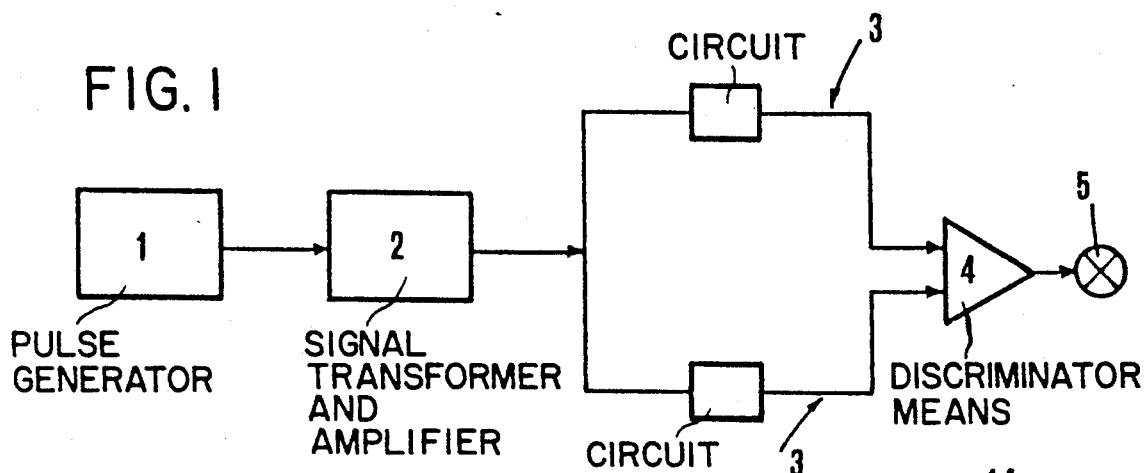
FIG. 1 is a block diagram of the device according to the invention.

With reference to FIG. 1, the device according to the invention consists, from left to right, of:

a pulse generator 1 operated by the speed measuring instruments of the vehicle;

a signal transformer-and-amplifier 2;

two electrical circuits 3 wired in parallel;

discriminator means 4 with two inputs, into which the two circuits 3 are cascaded;

visual or luminous indicator means 5.

Both circuits 3 receive the same signal from the transformer-amplifier 2, but are calibrated in such a way as to produce dissimilar output signals, which are fed into the discriminator means 4.

The discriminator means 4 are such that when the difference between the two input signals is either positive or nil, no output signal will be relayed to the indicator means 5. When the difference between the signals is negative, and greater in absolute value than a given minimum threshold, the indicator means 5 will operate.

Figure 2:
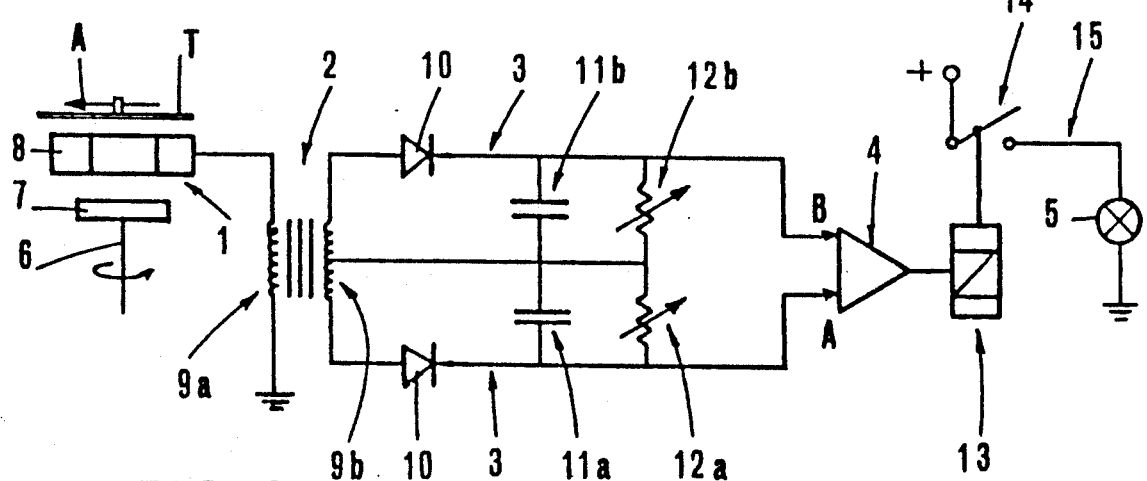
FIG. 2 provides the schematic illustration of a possible circuit for the block diagram illustrated in FIG. 1.

In one embodiment, the indicator means 5 will be the stop lights of the vehicle. However, the discriminator means 4 operates the stop lights not by direct action on the relative circuit, but by way of a separate circuit 15 (FIG. 2) wired in parallel with the standard vehicle circuit incorporating the switch operated by depressing the brake pedal (not illustrated).

In a preferred embodiment of the invention (See FIG. 2), the generator 1 consists of one or more electrical circuits 8 disposed in series in a plane parallel to the plane of rotation of a magnet 7. Rotary movement is imparted to the magnet by an element denoted 6, which in practice would be the sender unit by which the angular velocity of the gearbox output shaft is transmitted to the vehicle speedometer.

More exactly, the magnet 7 indicates the rotation of a given road wheel (or the gearbox output shaft), whereupon movement is transmitted from the sender 6 to the pointer A of the speedometer dial T according to a law of proportion.

The circuits denoted 8 (which in the example shown are Hall effect transducers), are connected to the primary 9a of a transformer 2. The secondary 9b drives two rectifier diodes 10. Thus, d.c. pulses produced by the magnet 7 and the Hall effect are converted by the transformer into a.c., and their voltage levels stepped up to precise values which are a function of frequency.

Each of the rectifiers 10 is cascaded into a relative circuit 3. Each circuit incorporates a relative capacitor 11a, 11b, which is wired in parallel with a respective variable resistance 12a, 12b. The rating of the two capacitors 11a and 11b and of the relative resistances 12a and 12b will be such as to circulate dissimilar currents in the two circuits 3.

The output of the discriminator means 4 cascades into a relay 13 wired to trip a switch denoted 14. The trip switch is wired into a circuit 15 that connects with the stop lights 5, and is installed in parallel with the standard pedal-operated stop light circuit (not illustrated).

The characteristics of the capacitors 11a, 11b and resistances 12a, 12b are such that any one of a given set of situations will be produced at the inputs A and B of the discriminator means 4.

Increased angular velocity of the sender unit 6, hence increased road speed, occasions higher voltage through the secondary 9b of the transformer 2, and through both inputs A and B. Accordingly, the potential difference between A and B is zero.

With constant angular velocity of the sender unit, the potential difference between A and B remains zero.

With reduced angular velocity of the sender, the potential difference between inputs A and B is never zero. The capacitors 11a and 11b are dissimilarly rated, and the discharge from the higher capacitance component is always positive in relation to the lower.

Figure 3:
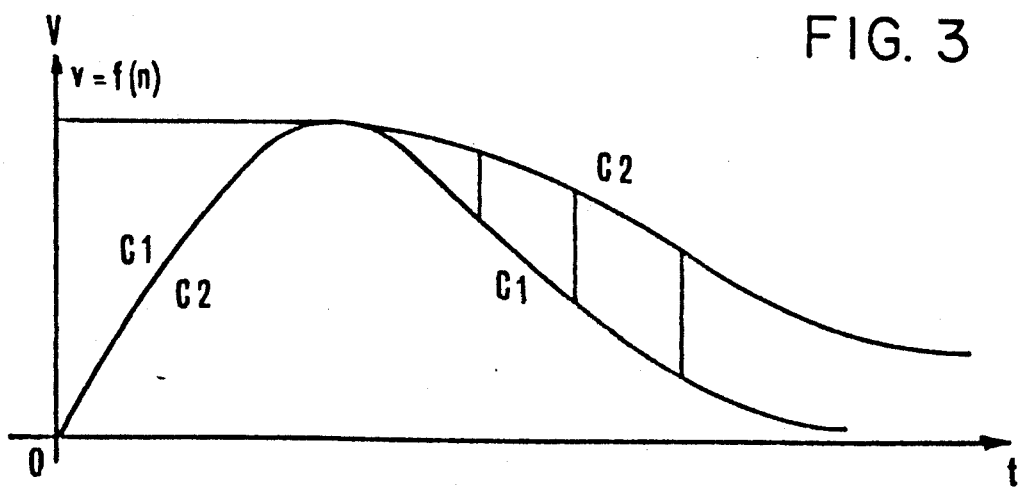
FIG. 3 shows a graph illustrating the curve of the input signals supplied to the discriminator of FIGS. 1 and 2.

FIG. 3 shows the charge and discharge curves of the two capacitors 11a and 11b. The curves, which are indicated $C_1$ to denote the lower rating and $C_2$ to denote the higher, provide a graphic illustration of what is described above. It will be seen that the two curves $C_1$ and $C_2$ rise as one when the capacitors 11a and 11b are charging, but separate in descent with the different discharge rates.

In the event that a negative difference in voltage levels at the inputs A and B exists, and is greater in absolute terms than a given selected threshold, the discriminator means 4 will excite the relay 13, thereby operating the switch 14 and completing the circuit 15 of the indicator means 5.

It will be observed that the divergence between the curves $C_1$ and $C_2$ during discharge is dependent on the vehicle's rate of deceleration. The more gradual the deceleration, the smaller the divergence. It follows, therefore, that normal deceleration will not produce a difference in voltage levels at the inputs A and B of the discriminator means 4 so as to generate an output signal strong enough to excite the relay 13.

By adjusting the variable resistances 12a and 12b, it is possible to shorten or to lengthen the response time lapse of the device. The adjustment accentuates or attenuates the divergence between the falling curves $C_1$ and $C_2$ in such a way as to advance or retard the rise of the potential difference between the inputs A and B of the discriminator means 4 above the minimum threshold at which the relay 13 is excited.

The device according to the present invention is insensitive to gravitational forces, and is totally unaffected by pitching and rolling movement of the motor vehicle. The vehicle can thus negotiate uphill and downhill gradients without affecting the normal operation of the device.

The device, which consumes just a few mA, is powered by the vehicle battery and can be housed comfortably in the speedometer/clock casing.

A particular advantage of the device according to the invention is that it is capable of replacing the braking system's pedal-operated stop light switch in the event of malfunction, because the stop lights 5 are operated by way of an independent circuit installed in parallel with the pedal switch.

In an alternative embodiment of the device, the Hall effect pulse generator 1 may be replaced by a photoresistive circuit with a notch or a flat surface sensed by a photosensitive element, or by a mechanical circuit with a rotary switch, such that a pin of appropriate shape fitted to the sender unit 6 makes and breaks a set of contacts continually in alternation. Any such embodiment is appropriate, provided it is able to produce a pulsed signal proportional to the road speed of the vehicle.

What is claimed:

1. An automatic device for sensing sudden deceleration, applicable to motor vehicles, comprising:
    generating means, interlocked to a vehicle speedometer, by which to generate a pulsed signal proportional to the rate of deceleration;
    means for conversion of the signal generated in proportion to the deceleration of the vehicle, consisting of a transformer capable of stepping up and supplying a voltage proportionate to the pulsed signal received by its primary circuit from the generator means;
    two circuits driven simultaneously by the secondary circuit of the transformer, each circuit comprising a capacitive-resistive circuit, which are designed to supply two signals of dissimilar strength to two corresponding inputs of a discriminator means;
    said discriminator means comparing the plus or minus value and the amplitude of the two input signals, hence the degree of variation in speed of the vehicle and, whenever the absolute difference between the signals exceeds a selected threshold signifying a sudden deceleration of the vehicle, an output signal is produced that will excite a relay; and
    luminous indicator means, the same as the stop lights conventionally located at the rear of a regular vehicle, which are connected to a dedicated circuit that is illuminated by excitation of the relay whenever the selected threshold is exceeded.

2. A device as in claim 1, wherein each capacitive-resistive circuit consists of a capacitor and a relative resistance connected in parallel.

3. A device as in claim 1, wherein the resistances are variable so as to permit the advancing or retarding of the rise in the signal strength at the inputs of the discriminator means to the selected threshold, thereby speeding up or slowing down the response of the device to sudden deceleration of the vehicle.

4. A device as in claim 1, wherein the indicator means are provided by the stop lights of the vehicle and the relay operates a switch of a circuit that supplies power to the stop lights and is installed in parallel with the existing stop light circuit of the regular vehicle.

5. A device as in claim 1, wherein means by which the pulsed signal is generated is electromagnetic.

6. A device as in claim 5, wherein means by which the pulsed signal is generated is electromagnetic, and produces a Hall effect.

7. A device as in claim 5, wherein means by which the pulsed signal is generated consists of a magnet, carried in rotation by a rotating element that transmits to the vehicle speedometer, which is designed to excite one or more electrical circuits disposed in series in a plane parallel to the plane of rotation of the magnet and connected to the primary circuit of the transformer.

8. A device as in claim 1, wherein means by which the pulsed signal is generated is photosensitive.

9. A device as in claim 8, wherein means by which the pulsed signal is generated consists of a photosensitive element capable of sensing the proximity of a notch or faceted surface in or on a rotating element that transmits to the vehicle speedometer, and upon sensing such a reference, opening a circuit to which the primary circuit of the transformer is connected.

10. A device as in claim 1, wherein means by which the pulsed signal is generated is mechanical.

11. A device as in claim 10, wherein means by which the pulsed signal is generated consists of a shaped pin, or similar projection, carried by a rotating element that transmits to the vehicle speedometer and designed to produce an alternating make and break movement of a switch completing a circuit to which the primary circuit of the transformer is connected.

12. A device as in claim 1, wherein miniaturization of the various components can be achieved by embodying the entire device on a microchip.

13. A device as claimed in claim 2, wherein the resistances are variable so as to permit advancing or retarding of the rise in the signal strength at the inputs of the discriminator means to the selected threshold, thereby speeding up or slowing down the response of the device to sudden deceleration of the vehicle.

* * * * *